(12) United States Patent
Lincoln et al.

(10) Patent No.: US 6,820,201 B1
(45) Date of Patent: Nov. 16, 2004

(54) SYSTEM AND METHOD USING INFORMATION-BASED INDICIA FOR SECURING AND AUTHENTICATING TRANSACTIONS

(75) Inventors: Patrick D. Lincoln, Woodside, CA (US); Natarajan Shankar, Los Altos, CA (US)

(73) Assignee: SRI International, Menlo Park, CA (US)

( * ) Notice: Subject to any disclaimer, the term of this patent is extended or adjusted under 35 U.S.C. 154(b) by 798 days.

(21) Appl. No.: 09/631,893

(22) Filed: Aug. 4, 2000

(51) Int. Cl.[7] .................................... H04L 9/00
(52) U.S. Cl. ................ 713/179; 713/176; 705/60; 705/62
(58) Field of Search ............... 380/55; 705/60, 705/62, 405; 713/176, 178, 179

(56) References Cited

U.S. PATENT DOCUMENTS

| | | | |
|---|---|---|---|
| 4,934,846 A | | 6/1990 | Gilham |
| 5,560,657 A | * | 10/1996 | Morgan ................... 283/80 |
| 5,612,889 A | | 3/1997 | Pintsov et al. |
| 5,655,023 A | | 8/1997 | Cordery et al. |
| 5,671,279 A | | 9/1997 | Elgamal |
| 5,778,076 A | | 7/1998 | Kara et al. |
| 5,799,086 A | * | 8/1998 | Sudia ..................... 705/76 |
| 5,805,702 A | | 9/1998 | Curry et al. |
| 5,822,739 A | | 10/1998 | Kara |
| 5,848,401 A | * | 12/1998 | Goldberg et al. ......... 705/408 |
| 5,936,865 A | | 8/1999 | Pintsov et al. |
| 6,005,945 A | | 12/1999 | Whitehouse |
| 6,029,137 A | | 2/2000 | Cordery et al. |
| 6,058,193 A | | 5/2000 | Cordery et al. |
| 6,064,989 A | | 5/2000 | Cordery et al. |
| 6,064,993 A | | 5/2000 | Ryan, Jr. |
| 6,134,328 A | | 10/2000 | Cordery et al. |
| 6,233,565 B1 | | 5/2001 | Lewis et al. |
| 6,237,095 B1 | | 5/2001 | Curry et al. |

(List continued on next page.)

FOREIGN PATENT DOCUMENTS

| | | |
|---|---|---|
| WO | WO 00/08788 | 2/2000 |
| WO | WO 00/78032 A3 | 12/2000 |
| WO | WO 02/27618 A2 | 4/2002 |

OTHER PUBLICATIONS

Alan Burdick, "The Document That Can't Be Forged," *N.Y. Times*, Jun. 2000.
International Application Under the Patent Cooperation Treaty—WO 00/65541 published on Nov. 2, 2000.

*Primary Examiner*—Douglas Meislahn
(74) *Attorney, Agent, or Firm*—Gray Cary Ware & Freidenrich LLP

(57) ABSTRACT

A method, system, and apparatus for authenticating transactions and records is disclosed. A nonce stamp is a physical article that is relatively difficult to copy illicitly, and that bears a "nonce" number. The "nonce" is a relatively unique identifier, in that it is chosen from a distribution such that any given user/customer is extremely unlikely to obtain two nonce stamps bearing the same nonce. The method includes: presenting a nonce stamp having a nonce number; presenting a numbered digital certificate derived securely from the nonce number; and authenticating the transaction by comparing the number on the digital certificate and the nonce number. The digital certificate is typically obtained by users/customers in exchange for the purchase price of a desired transaction. The apparatus is an information-based indicium including a nonce stamp, and a digital certificate including a number derived securely from the nonce. The system generates information-based transaction indicia, and typically includes one or more computers configured to receive as input a nonce number from a user; encrypt the nonce number, and provide to the user a digital certificate including the encrypted nonce number, so that the nonce and the digital certificate may be collectively presented as an information-based transaction indicium to authenticate a transaction.

21 Claims, 4 Drawing Sheets

U.S. PATENT DOCUMENTS

| | | |
|---|---|---|
| 6,244,763 B1 | 6/2001 | Miller |
| 6,292,893 B1 * | 9/2001 | Micali .......................... 713/158 |
| 6,308,165 B1 | 10/2001 | Gilham |
| 6,349,292 B1 | 2/2002 | Sutherland et al. |
| 6,385,504 B1 | 5/2002 | Pintsov et al. |
| 6,408,286 B1 | 6/2002 | Heiden |
| 6,424,954 B1 * | 7/2002 | Leon ........................... 705/401 |
| 6,442,276 B1 * | 11/2002 | Cordery et al. ................ 380/51 |
| 6,480,831 B1 * | 11/2002 | Cordery et al. ................ 705/60 |
| 6,523,014 B1 * | 2/2003 | Pauschinger ................ 705/410 |
| 2001/0013025 A1 | 8/2001 | Ananda |
| 2001/0039625 A1 | 11/2001 | Ananda |
| 2001/0042052 A1 * | 11/2001 | Leon ........................... 705/401 |
| 2001/0044783 A1 | 11/2001 | Weisberg et al. |
| 2002/0023955 A1 | 2/2002 | Frank et al. |
| 2002/0040346 A1 | 4/2002 | Kwan |
| 2002/0046196 A1 | 4/2002 | Ogg |
| 2002/0054334 A1 | 5/2002 | Harrison et al. |
| 2002/0073039 A1 | 6/2002 | Ogg et al. |
| 2002/0073040 A1 | 6/2002 | Schwartz et al. |
| 2002/0083019 A1 | 6/2002 | Bystrak et al. |
| 2002/0091545 A1 | 7/2002 | Heiden et al. |
| 2002/0091640 A1 | 7/2002 | Gupta |
| 2002/0178354 A1 * | 11/2002 | Ogg et al. ................... 713/155 |

* cited by examiner

[FIGURE 1]
[Prior Art – from http://56.0.78.92/html/ibimain.html]

SYSTEM AND METHOD USING INFORMATION-BASED INDICIA FOR SECURING AND AUTHENTICATING TRANSACTIONS

TECHNICAL FIELD OF THE INVENTION

System, method, and apparatus for authenticating or validating a transaction or record using information-based indicia of payment or authorization.

BACKGROUND OF THE INVENTION

The United States Post Office (USPO) has been considering electronic postage stamps for several years. According to the USPO, electronic postage should be printed on an envelope in the upper right hand corner (or on a label for an envelope or package), convey evidence that postage has been paid, contain mail processing data requirements, and contain security-related data elements. As shown in FIG. 1, the USPO desires that an electronic postage stamp be made up of human readable information as well as a two dimensional barcode with the following information:

Licensing ZIP Code

Date of Mailing

Destination Delivery Point

Postage

Software ID

Digital Signature

Ascending Register

Rate Category

Descending Register

Reserve Field

Algorithm ID

Indicia Version Number

Device ID

Certificate Serial Number

There are presently several competing commercial schemes for electronic postage. Typically these schemes are based on digital certificates. One such scheme provides a way for the postal vendor to access a secure nonvolatile memory on a user's computer with a postage printing program. The goal here is to control the printer so that it never prints a given certificate twice, i.e., never prints the same certificate onto more than one copy of a label or envelope. Yet another scheme uses a unique mail piece identifier generated by a trusted third party for encrypting the postage information. The encrypted information is then printed on the mail piece. The problem with such methods is that because certificate information can be easily photocopied, the goal of security is not achieved. Unless the certificates are checked for re-use with an expensive database lookup system, there is no reliable way to prevent the certificate information from being copied and reused illicitly. Thus, none of the competing schemes provide a way to fully authenticate the electronic transactions generating the electronic stamps. Without adequate protection against copying, tremendous amounts of revenue are at risk.

Another problem with current schemes is that they typically do not provide an easy mechanism for revocation and replacement of electronic stamps in the case that an envelope tears or the printer jams. In advertent failure to mail a stamped article on the date encoded in the e-stamp certificate results in a similar problem—how can the user avoid forfeiting the money spent to purchase the postage? Some current schemes provide limited functionality for redating or otherwise correcting e-postage, but current techniques are typically clumsy and inefficient, which is particularly costly when one considers that postage stamps are used in extremely heavy volume.

The same needs and problems apply more generally to information-based indicia ("IBI") for transactions besides postage, such as facility admission tickets (for events, movies, travel, etc.), coupons, vouchers, certificates, visas, receipts, and checks.

SUMMARY OF THE INVENTION

The present invention provides a method, apparatus, and system for securing and authenticating information based indicia that substantially eliminates or reduces certain disadvantages from previous IBI systems and methods.

One aspect of the invention described herein includes presenting a nonce stamp bearing a nonce; presenting a numbered digital certificate derived securely from the nonce, such as by encryption; and authenticating the transaction by comparing the number on the digital certificate and the nonce.

Typically the nonce may be represented on the nonce stamp in a form such as a bar code that can be read by humans and/or by standard image scanners. The digital certificate may be marked on a physical medium, and represented in the form of a two dimensional bar code.

Verifying the authenticity of a presented nonce stamp/certificate pair (and/or the authenticity of the transaction for which they are presented as indicia) is accomplished by comparing the number on the digital certificate and the nonce. Where the certificate is derived by encrypting the nonce using a private key for which an associated public key is made widely available, verification may be performed by decrypting the number on the presented digital certificate and matching the result against the presented nonce. Alternatively, if there is no public key then the verifying authority will be given access to the private key, and can perform verification by encrypting the presented nonce and comparing the result with the number on the presented digital certificate.

In typical applications, an end user customer obtains a digital certificate to accompany a nonce stamp by specifying a desired transaction, paying the purchase price for that transaction, and inputting the nonce number from a nonce stamp of the user. In some embodiments, users may obtain digital certificates remotely such as via an electronic communications network. In such embodiments digital certificate information (including the encrypted number for the digital certificate) may be electronically transmitted to the user via network, and a tangible copy of the certificate is printed locally for the user.

In a preferred embodiment, the numbered digital certificate further includes a description of at least one element of the desired transaction, for example, purchase price, purchased product/service, and/or transaction authority.

In typical applications, the nonce stamp and the numbered digital certificate are physically linked or coupled together, such as by printing the numbered digital certificate onto the nonce stamp, or by affixing the stamp and certificate to each other or to an article of the transaction such as a mailing envelope.

In one application, the transaction includes depositing an article of mailing, and the nonce stamp and the numbered digital certificate are presented as postage. In another application, the transaction includes admission to a facility, and the nonce stamp and the numbered digital certificate are presented as an admission ticket. In yet other applications, the nonce stamp and digital certificate function as traveler's checks or as personal checks.

Apparatus of the invention includes an information-based indicium for authenticating a desired transaction. This indicium includes a nonce stamp having a nonce; and a digital certificate including a number derived securely from the nonce, such that the digital certificate and the nonce stamp may be presented together to authenticate the desired transaction. In another aspect of the invention, the information-based indicium may comprise a forgery-resistant physical article bearing an identification number; and a digital certificate including a number derived securely from the identification number, such that the digital certificate and the forgery-resistant article may be presented together to authenticate the desired transaction.

Further aspects of the invention include a system for generating information-based transaction indicia for a user's desired transaction. The system includes one or more computers configured to receive as input a nonce number from the user's nonce stamp; to encrypt the nonce number; and to provide to the user a digital certificate including the encrypted nonce number, such that the nonce stamp and the digital certificate may collectively be presented as an information-based indicium to authenticate the desired transaction. In typical applications, the one or more computers are further configured to specify a user's desired transaction and to charge the user a transaction price for the desired transaction, in exchange for providing the digital certificate. In some applications the computers may not be configured to charge the user prior to providing the digital certificate, and instead the user may be charged (such as through a banking system) after the certificate/nonce stamp pair is negotiated.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the figures, like numerals being used to refer to like and corresponding parts of the various drawings.

For convenience we define the term "nonce stamp." The term "nonce stamp" is used herein to denote a physical article that is relatively difficult to copy illicitly (or equivalently, for which forgeries are easily detected and are preferably traceable)—such as a typical postage stamp, for example—and that also bears a "nonce." In computer science, the term "nonce" generally means a "fresh number," a number that is unique or virtually unique within some context of interest. In the context of the present invention, "nonce" denotes a number (or other datum) chosen from a good enough distribution to ensure relative "uniqueness," i.e., a low likelihood that a single user/customer can accumulate multiple nonce stamps bearing the same nonce number. It should be noted, as will be apparent to practitioners in light of the teachings herein, that postage is just one beneficial application for the present invention and is by no means the only one. The term "nonce stamp" is not intended to narrowly denote postage stamps only, but should rather be construed broadly to denote any physical article that is relatively difficult to copy illicitly and that incorporates a nonce.

By way of introduction, the present invention provides a nonce stamp based system, method, and apparatus for creating and checking information-based indicia suitable for trusted authentication of transactions. Such indicia may include, for example, postage, admission tickets, coupons, vouchers, certificates, visas, receipts, and checks. In a preferred aspect of the invention, physical nonce stamps are created and distributed freely at little or no cost to users/customers. Users can then use convenient means to order, purchase and print digital certificates for postage or for other desired transactions as needed, as will be described below. Because each nonce stamp has no economic value without an accompanying authentic digital certificate, the nonce stamps can be widely distributed in large numbers in advance at nominal cost. An encryption process for generating authentic digital certificates based on the nonce effectively prevents illicit creation of digital certificates that can satisfy the authentication check, as discussed in more detail below. And physical duplication of an authentic digital certificate poses no economic threat, because each certificate can only be used to authenticate a transaction (and thus only has economic value) if accompanied by the single, duplication-resistant nonce stamp from which the authentic certificate was derived.

Figure 2:
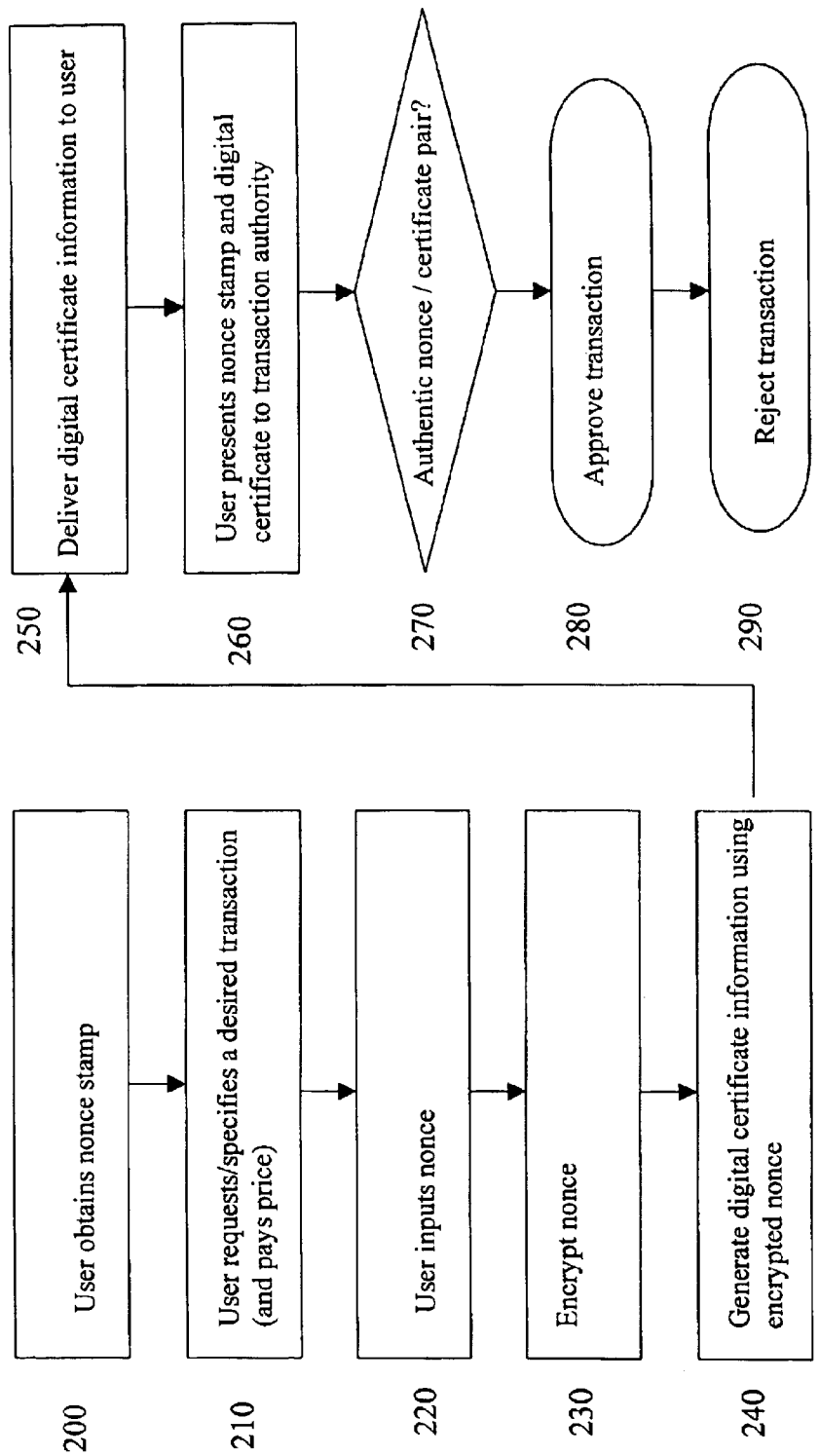
FIG. 2 is a flow chart illustrating one embodiment of the method of the invention.

One embodiment of a method in accordance with the present invention is illustrated in FIG. 2. A user first obtains a nonce stamp 200, typically for no charge or for nominal charge. In order to conduct an authenticated transaction, a user/customer submits a request for a transaction certificate by specifying the desired transaction 210 (e.g., an order for a quantity of U.S. postage) and by typically making payment of the price for the desired transaction, and also presents and/or inputs (220) the nonce stamp number. Note that in practice and as a matter of convenience, users may be required to pre-purchase minimum-size blocks of credits for their account (e.g., for postage), and in that case payment 210 typically entails an electronic deduction being made from the user's pre-paid account. In any event, and in response to inputs 210–220, the nonce is encrypted (230). Standard encryption techniques as known to practitioners are sufficient; an underlying principle being that the encryption key preferably should not be readily recoverable from knowledge of particular nonce/encrypted nonce pairs, since otherwise it becomes trivial to illicitly create an authentic-seeming digital certificate for any given nonce. The result of encryption 230 is included in digital certificate information that is generated 240 and delivered to the user 250.

Next, at step 260, the user/customer presents the nonce stamp and digital certificate pair to a vendor or other transaction authority to authenticate the desired transaction, such as by affixing the nonce stamp and digital certificate as postage on an article of mailing and depositing the article into the mail system. At decision point 270, the authenticity of the desired transaction is verified by comparing the number contained on the digital certificate and the nonce on the nonce stamp. In embodiments of the present invention, this comparison test can be done in relatively straightforward algorithmic fashion. For example, in some applications the authenticating authority's testing computer will have private access to the same secure encryption key that is used to generate digital certificates from nonces. Thus, when presented with a given certificate/nonce pair for authentication at step 270, the transaction authority's testing computer can preferably apply encryption to the presented nonce, and simply check the result for identity with the number contained in the presented certificate. In other applications, a public key is available allowing authenticating authorities to decrypt the certificate and match the resulting number against the presented nonce number at step 270; in accordance with the principles of public key cryptography, well-known to practitioners in the art, the public key works only in one direction, and thus permits decryption of a given certificate but does not enable (potentially illicit) generation of new, encrypted certificates for other nonce numbers. In either case, there is no need, e.g., for an expensive database tracking all digital certificates. If the result of that test 270 is a match, then the transaction authority can approve the transaction 280 (e.g., USPO can accept and deliver the article of mailing), whereas if there is no match, then the authority can reject the transaction 290 (e.g., USPO returns the article for lack of authentic postage). Note that in embodiments where public key cryptography is used, anyone with access to the public key can verify the authenticity of a presented nonce/certificate pair (although they cannot illicitly generate such pairs). Thus, for example, a customer can verify the authenticity of a purchased certificate prior to mailing his/her letter etc., and can contact the certificate vendor if errors are detected.

Figure 3A:
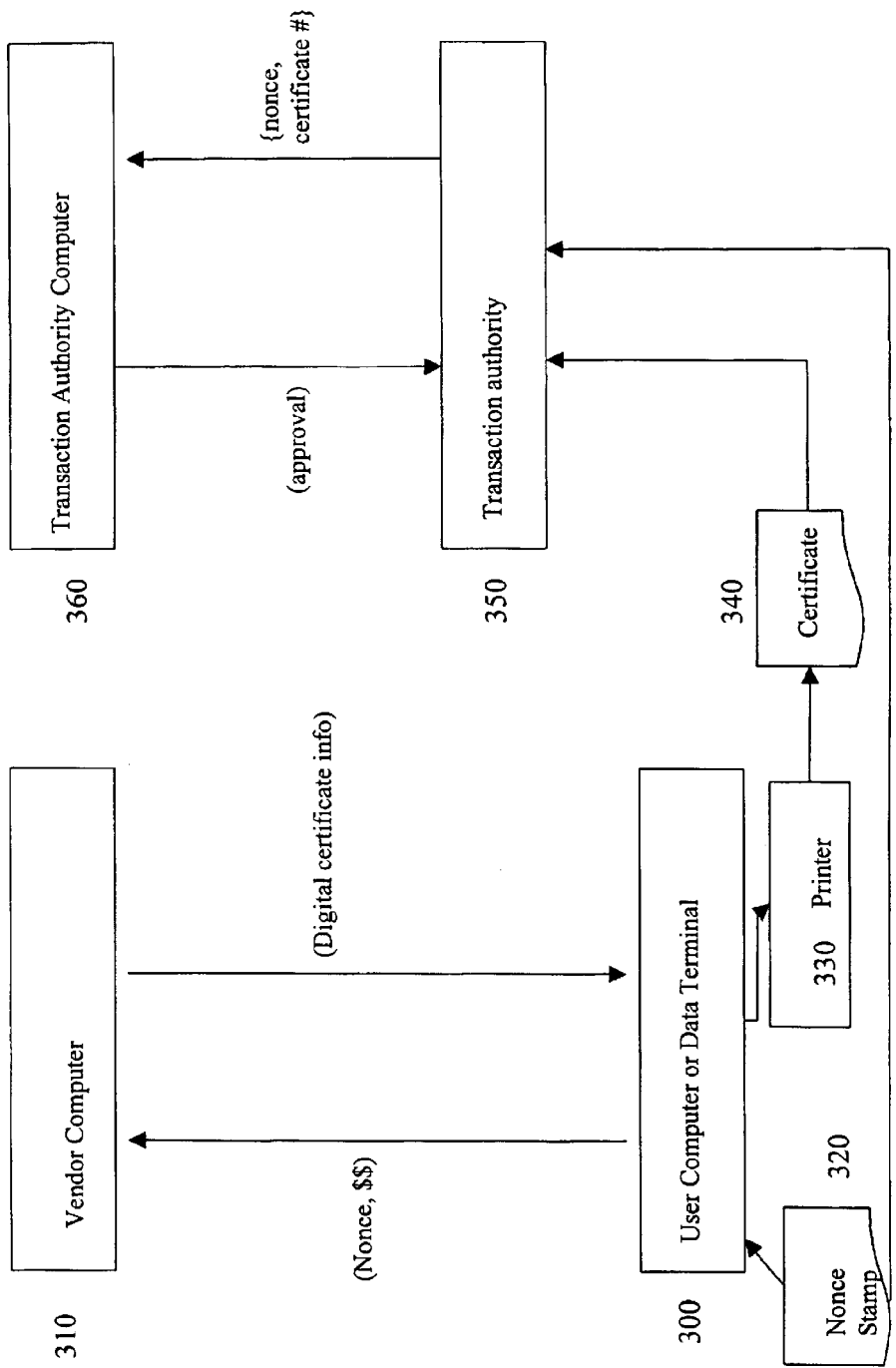
FIG. 3a is an illustration of a system used in the practice of the invention.

FIG. 3a illustrates one embodiment of a system for practicing methods of the present invention. With respect to the method illustrated in FIG. 2 and the system illustrated in FIG. 3a, after obtaining 200 nonce stamp 320, the user can submit his or her transaction certificate request along with payment information (e.g. credit card number) and with nonce input by using data terminal 300, such as a standard PC, portable computer, PDA, or even a telephone (steps 210–220). This information is electronically transmitted over network links to vendor computer 310. In a preferred embodiment, data terminal 300 executes standard internet/web browser software (not shown) and uses standard e-commerce infrastructure to support the interaction between user data terminal 300 and vendor computer 310.

In response, the nonce is encrypted 230 by vendor computer 310. The result of encryption 230 is embodied in digital certificate information that is generated and delivered to the user (240–250) in order to provide the user with digital certificate 340. As one example, digital certificate 340 might be produced by first generating an electronic image file by vendor computer 310 based on the result of encryption 230; that image file would then be e-mailed to user data terminal 300, and standard computer printer 330 would then be used to print a hard copy of the digital certificate 340. In another example, vendor computer 310 might simply send the digital certificate number to user terminal 300, and in turn software executing locally at user terminal 300 would generate digital certificate 340 and cause it to be printed on printer 330. In an embodiment where data terminal 300 comprises a standard touch-tone telephone for purposes of input 220–230, various approaches are possible: by way of example, in some variations digital certificate image information might be sent to a user's fax machine (not shown), and in other variations the encrypted number can be communicated to the user via telephone and digital certificate 340 can be manually inscribed by the user on nonce stamp 320 or on the transaction object of interest (e.g., an article of mailing).

Next, at step 260, the user/customer presents nonce stamp 320 and digital certificate 340 to transaction authority 350 to authenticate the desired transaction. At decision point 270, transaction authority 350 verifies the authenticity of the desired transaction by submitting the number contained on digital certificate 340 and the nonce on nonce stamp 320 to transaction authority computer 360 for a comparison test. In typical applications the transaction authority's computer 360 either has private access to the same secure encryption key that is used by vendor computer 310 to generate digital certificates from nonces, or else has access to a public decryption key as discussed above. Thus, when presented with a given certificate/nonce pair for authentication at step 270, computer 360 can preferably apply encryption to the presented nonce, and simply check the result for identity with the number contained in the presented certificate—or, in the public key variation, can decrypt the certificate and check the result for identity against the presented nonce—as described above. Note that transaction authority computer 360 need not necessarily be the same physical machine as vendor computer 310 (although it can be); nor must computers 310 and 360 necessarily be kept linked by network or otherwise. Also note that at decision point 270 transaction authority 350 preferably also physically examines the presented nonce stamp to screen out amateur forgeries and the like.

Figure 3B:
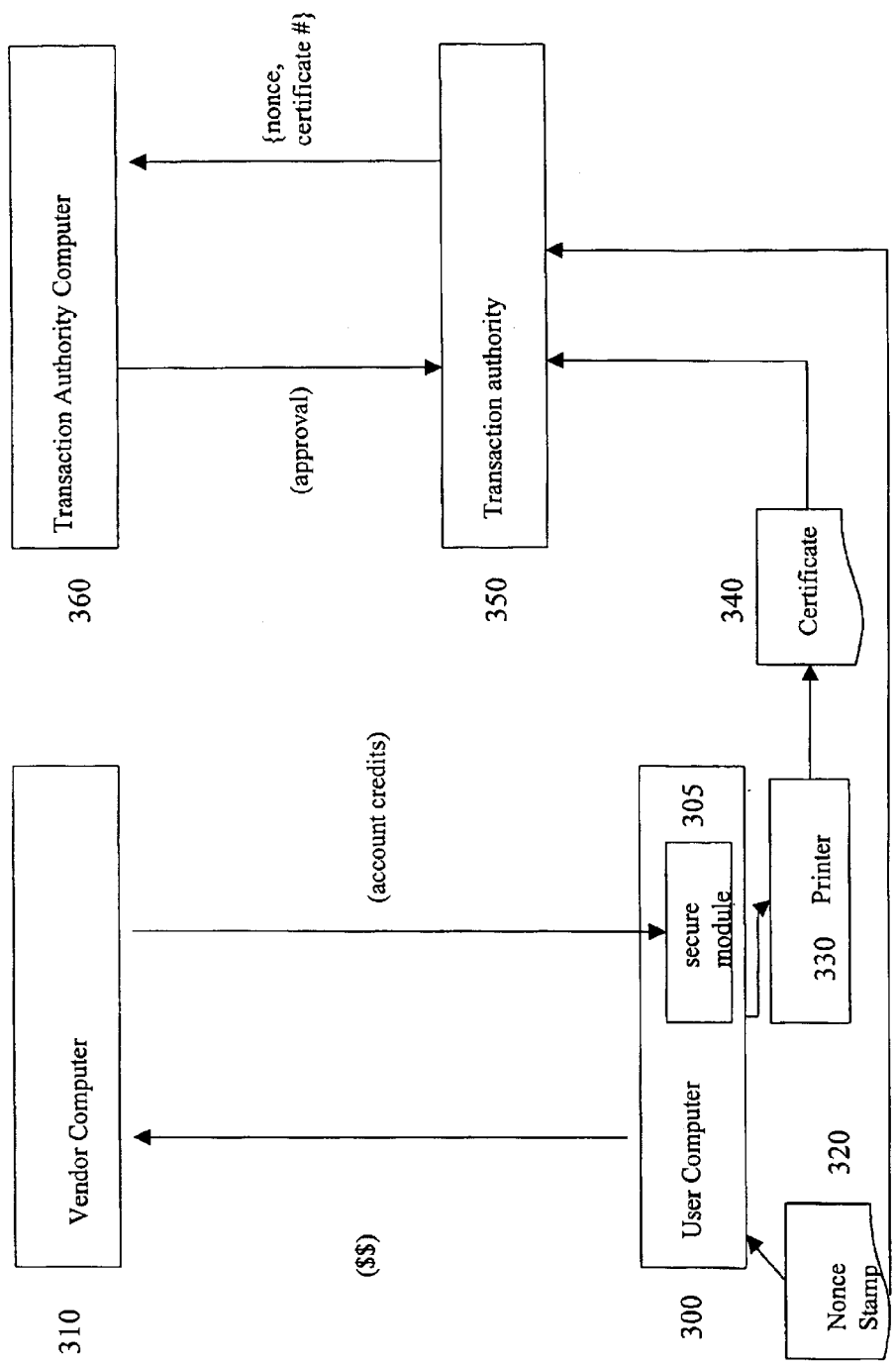
FIG. 3b is an illustration of a further system used in the practice of the invention.

An additional embodiment for practicing the method of FIG. 2 is illustrated in FIG. 3b. In this variation, user 300 need not be connected electronically with vendor 310 when operations 210–250 are carried out. Instead, users/customers first obtain tamper-resistant secure module 305 from vendor 310, along with accompanying control software to be installed on user computer 300. Users can connect electronically to vendor 310 and purchase convenient blocks of credits (postage credits, for example) at any time, in response to which vendor computer 310 electronically deposits credits to secure module 305. Having performed this initial set-up, users can then initiate operations 210–250 on user computer 300 by interacting locally with secure module 305, without necessarily being connected to vendor 310. Secure module 305 automatically debits its electronic account for the user by the price of the requested purchase 210, and performs secure encryption 230. Secure module 305 is preferably tamper-resistant hardware and/or software, in the sense of being protected such that users cannot "hack" or modify its operation without disabling it completely; e.g., users cannot illicitly adjust the electronic account balance or suppress deduction of the purchase price when certificates are generated. Embodiments of tamper-resistant modules for electronically purchasing blocks of postage credit are already commercially available (e.g., "Electronic Vault" provided by E-Stamp of Mountain View, Calif., www.estamp.com)—except that such current systems do not create nonce stamp-linked digital certificates and do not practice the present invention. Thus, embodiments of secure module 305 can be constructed by practitioners in light of the novel teachings disclosed herein.

The nonce is preferably selected randomly from a good enough distribution to ensure relative "uniqueness," i.e., a low likelihood that a single user/customer can accumulate multiple nonce stamps with the same number (since doing so would enable the user to purchase a single authentic digital certificate from one such nonce, and then illicitly make and use copies of that certificate with each of the identical nonce stamps). In a preferred embodiment, the nonce is structured and preferably includes a random number component as well as source information, a digital signature, and whatever other information may be deemed useful for a given application. In the context of postage, for example, this allows checking the validity of the source of the stamp: e.g., the source jurisdiction (country, postal zone or branch, etc.) can be encoded and checked. In some applications, the nonce contained on the nonce stamp is printed in the form of a bar code, while the encrypted number printed on the digital certificate is a two dimensional bar code. In a preferred embodiment, the nonce is represented in a form (such as a bar code, for example) that can be read by humans and/or by standard image scanners, so that the user does not necessarily need special-purpose hardware in order to input nonce information when obtaining a digital certificate. In various embodiments, the nonce stamp and derived digital certificate are physically affixed to a transactional object for which authentication is desired by the user/customer (e.g., affixing nonce postage to an article of mailing); in other embodiments either or both of the certificate/nonce stamp pair may remain unattached; in some embodiments the certificate may be printed, marked, or affixed onto the nonce stamp; and in various embodiments there may not be a transactional object separate from the nonce stamp itself (e.g., nonce admission tickets for movies or special events, or pre-printed nonce envelopes for mailing).

In further embodiments and variations, multiple digital certificates may be required in combination with a single nonce stamp, akin to requiring multiple signatures for approval of a transaction. A further variation would require multiple, distinct nonce stamp/certificate pairs as authentication indicia for a single transaction, in order to further protect against the (unlikely) prospect of a user ever obtaining duplicate nonces. In yet another embodiment, the digital certificate may be presented to the transaction authority (step 260, FIG. 2) by electronic transmission and not necessarily in printed or other tangible form.

Figure 1:
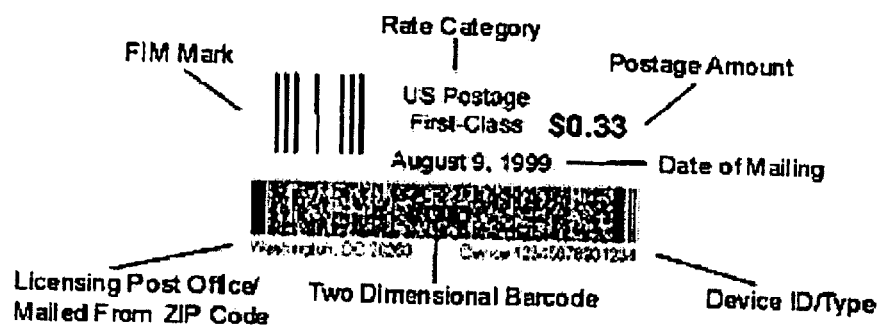
FIG. 1 is an illustration of a prior art IBI as described by the United States Post Office.

A preferred, illustrative application for nonce stamps is electronic postage. In an embodiment of this application, the postal service or an authorized agent issues and distributes nonce stamps at nominal or zero cost. When a customer wishes to purchase an amount of postage, the nonce number, the desired postage amount, and various other bits of information (such as data required by the USPO as shown in FIG. 1) are combined to generate a digital certificate. Generation and purchase of the digital certificate can be conducted conveniently by the customer in an online electronic transaction leveraging conventional e-commerce infrastructure, as described previously in connection with FIGS. 3*a* and 3*b*. The postal item can then be mailed by or for the customer by affixing the digital certificate and the original nonce stamp. The authenticity of the postage can be established by checking the nonce in the affixed nonce stamp against the number incorporated in the digital certificate, as described earlier, and in addition the certificate can be examined for authenticity of other indicia such as the signature etc.

Another illustrative application involves online/remote purchase of admission tickets, in a context where manually examining each customer's ID at the door is impractical or is at least too time consuming to be optimal (such as for movie theater admissions). Zero-value nonce tickets can be distributed in large quantity at zero or nominal cost by movie theaters, concert venues, etc. Users/customers who purchase tickets online can input the nonce from a nonce ticket they have around, and obtain a digital certificate as illustrated in FIG. 2. In some applications, the certificate would also explicitly specify the particular movie or event for which admission was purchased. In one embodiment, users would obtain (again, at relatively nominal cost) blank stickers designed to be fed to standard computer printers, upon which the purchased digital certificate information would be printed. Users would affix such a printed sticker to a nonce ticket, and scanner/reader machines at the admission doors to participating theaters and venues would immediately confirm or reject the validity of such tickets. Here, again, the threat of users making multiple copies of purchased certificates is defeated by requiring that each certificate be presented and surrendered along with the copy-resistant nonce ticket used to derive that certificate.

Another illustrative application facilitates the convenient, online/remote purchase of traveler's checks. Here again, zero-value nonce checks can be made readily available to prospective customers in relatively large quantity at zero or nominal cost. Users/customers can conveniently purchase valuable checks online by inputting the nonce from a nonce check they have around, and obtaining a digital certificate as illustrated in FIG. 2. In one embodiment, users would print the received digital certificate information onto stickers as in the previous example; in another embodiment, users could manually write the digital certificate information on the check. On presenting the check to a merchant the merchant could verify the authenticity of the instrument by scanning or keying the nonce number and the certificate number, and using a public decryption key made available by the issuing bank to perform the authentication check as discussed previously in connection with decision point 270 (FIG. 2).

In this application, merchants preferably would continue to require customer signatures and ID verification as with traditional traveler's checks; the invention basically allows easy authentication of a presented check (i.e., is this check backed by a promise to pay by the issuing bank, or is it a forgery), whereas a user ID check is still required to deter theft of checks and allow issuing banks to offer replacement/refund of lost or stolen checks. In a preferred embodiment, nonce checks would visually indicate a denomination amount ($20, $50, $100, etc.) such that users cannot easily forge the denomination, and the nonce number would also include a component reflecting that amount so that users cannot illicitly purchase, say, a $20 digital certificate for use with a $100 denomination nonce check. In the latter case, vendor computer 310 would catch and refuse the $20 order because it would compare the denomination component of the input nonce number with the requested certificate denomination; and of course if a user inputs a false nonce number in which the denomination component has been changed (say from 100 to 020), then the resulting $20 digital certificate will not test as authentic when paired with the $100 denomination nonce check that the user actually holds.

Applications are also possible in which the user does not pay a transaction price in advance, in exchange for the certificate; instead, an authentic nonce stamp/certificate pair would work like a personal check, but with enhanced protection against forgery. A merchant who accepts an authentic nonce check/certificate pair would negotiate the pair through the banking system.

Nonce postage, nonce tickets, and other nonce stamp applications offer several potential advantages over existing forms of information based indicia. For example, their authenticity can be easily checked without requiring expensive database maintenance and lookup, as previously discussed. In addition, because digital certificates can be reproduced with relative ease, existing electronic stamps (for example) typically encode extra information within each certificate, such as addressee information and the date of mailing, in order to prevent the same e-stamp from being reused on a different day or with a different addressee; but consequently, any change in the date of mailing may entail forfeiting value. In contrast, in accordance with the present invention, a vendor of nonce digital certificates can, if requested by a user and if legitimate exchanges are allowed, transmit an extra copy of a previously purchased digital certificate but with a new date (or can disseminate to users electronic certificates and software making the date field very easily modifiable), secure in the knowledge that the user/customer can ultimately only use one copy of a certificate with a given encrypted number to authenticate a transaction, because of the required binding to an irreproducible nonce stamp. (Alternatively, nonce stamps in accordance with the present invention may obviate the need for restrictive date constraints, since nonce stamps can provide reasonably strong confirmation of authenticity based simply on the nonce number and the certificate number.) For similar reasons, a digital certificate that requires any other modifications not affecting price (e.g., user wishes to change the addressee zip code field in a postage certificate), or that is accidentally damaged or destroyed such as by a printer jam, can readily be replaced in accordance with preferred embodiments of the present invention.

The invention presents a general scheme for establishing and checking the authenticity and uniqueness of electronic certificates. While the above description includes many specifics and examples, these should not be construed as limitations on the scope of the invention, but rather as exemplification of a preferred embodiment thereof. Many other variations are possible. For example, the markings on the nonce stamp do not have to be numeric. Any marking, image, or other fixed encoding of information on a forgery-resistant physical object that can be conveniently and securely encrypted to yield a derived encoding that can be incorporated into a digital certificate, would serve just as well. Likewise, the "number" on the digital certificate need not be marked in explicitly numeric fashion. Practitioners will further recognize that a wide variety of applications for information-based indicia may be practiced in accordance with, and by taking advantage of, the methods and systems disclosed herein.

Although the present invention has been described in detail, it should be understood that various changes, substitutions and alterations can be made hereto without departing from the spirit and scope of the invention as described by the appended claims.

What is claimed is:

1. A method for authenticating a transaction comprising the steps of:
    presenting a nonce stamp having a nonce, wherein the nonce comprises a relatively unique number that substantially prevents a single user from accumulating multiple nonce stamps bearing the same nonce;
    securely deriving a digital certificate from the nonce, wherein the nonce is received via the nonce stamp prior to deriving the digital certificate;
    presenting a digital certificate derived securely from the nonce; and
    authenticating the transaction by comparing the digital certificate and the nonce.

2. The method of claim 1, wherein the nonce is represented on the nonce stamp within a bar code.

3. The method of claim 1, wherein the digital certificate is marked on a physical medium.

4. The method of claim 1, wherein the digital certificate is represented within a two dimensional bar code.

5. The method of claim 1, wherein the digital certificate is derived by encrypting the nonce.

6. The method of claim 5, wherein comparing the digital certificate and the nonce comprises encrypting the nonce, and matching the encrypted nonce against the digital certificate.

7. The method of claim 5, wherein comparing the digital certificate comprises decrypting the digital certificate and matching the decrypted digital certificate with the nonce.

8. The method of claim 1, further comprising obtaining the digital certificate for a user by paying a purchase price for the transaction.

9. The method of claim 8, wherein obtaining the digital certificate is performed remotely via an electronic communications network.

10. The method of claim 9, wherein the user is in physical possession of the nonce stamp, and wherein obtaining the digital certificate for the user further comprises remotely transmitting the nonce.

11. The method of claim 10, wherein obtaining the digital certificate further comprises deriving the digital certificate by encrypting the nonce remotely transmitted for the user.

12. The method of claim 11, wherein obtaining the digital certificate further comprises transmitting digital certificate information, including the digital certificate, to the user via the electronic communications network.

13. The method of claim 12, wherein obtaining the digital certificate further comprises receiving the digital certificate information and locally printing a tangible copy of the digital certificate.

14. The method of claim 8, wherein obtaining the digital certificate is performed using a tamper-resistant module at a system local to the user, the tamper-resistant storing user account information.

15. The method of claim 14, wherein the user connects electronically to a remote vendor in order to purchase credit for the user account stored by the tamper resistant module.

16. The method of claim 15, wherein the vendor remotely updates, via electronic network, the account information in the tamper-resistant module.

17. The method of claim 1, wherein the digital certificate further comprises a description of at least one element of the transaction selected from the group consisting of purchase price, purchased product/service, transaction authority.

18. The method of claim 1, wherein the nonce stamp and the digital certificate are physically coupled together.

19. The method of claim 18, wherein the digital certificate is printed on the nonce stamp.

20. The method of claim 1, wherein the nonce stamp and the digital certificate are physically coupled to an article of the transaction.

21. The method of claim 1 wherein the transaction comprises depositing an article of mailing, and the method further comprises presenting the nonce stamp and the digital certificate as postage for the article of mailing.

* * * * *